United States Patent
Arakawa et al.

(10) Patent No.: US 8,654,839 B2
(45) Date of Patent: Feb. 18, 2014

(54) VIDEO SIGNAL CODING APPARATUS AND VIDEO SIGNAL CODING METHOD

(75) Inventors: Hiroshi Arakawa, Nara (JP); Yuki Maruyama, Osaka (JP); Hideyuki Ohgose, Osaka (JP); Kiyofumi Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 578 days.

(21) Appl. No.: 12/700,048

(22) Filed: Feb. 4, 2010

(65) Prior Publication Data

US 2010/0202513 A1 Aug. 12, 2010

(30) Foreign Application Priority Data

Feb. 6, 2009 (JP) .................. 2009-025722

(51) Int. Cl.
*H04N 7/12* (2006.01)
(52) U.S. Cl.
USPC ................................. 375/240.03
(58) Field of Classification Search
USPC ................................. 375/240.03
See application file for complete search history.

(56) References Cited

U.S. PATENT DOCUMENTS

| | | | |
|---|---|---|---|
| 4,984,076 A | | 1/1991 | Watanabe et al. |
| 5,189,530 A | * | 2/1993 | Fujii .............................. 382/166 |
| 5,337,049 A | * | 8/1994 | Shimoda ......................... 341/50 |
| 6,091,774 A | | 7/2000 | Hyodo et al. |
| 6,151,360 A | * | 11/2000 | Kato et al. ................ 375/240.03 |
| 2004/0184534 A1 | * | 9/2004 | Wang ....................... 375/240.03 |

FOREIGN PATENT DOCUMENTS

| | | |
|---|---|---|
| JP | 7-212598 | 8/1995 |
| JP | 2000-261805 | 9/2000 |
| JP | 2007-019878 | 1/2007 |
| JP | 2007-158430 | 6/2007 |
| JP | 2009-206567 | 9/2009 |

OTHER PUBLICATIONS

ITU-T H. 264: "Infrastructure of audiovisual services—Coding of moving video, Advanced video coding for generic audiovisual services", Mar. 2005.
H.264/AVC Textbook, Impress Company (2004) with partial English translation pp. 82-83, L.14.
Full English translation of (paragraphs [0019]-[0020], [0023], Figures 2 and 3) of Japanese Publication No. 07-212598 published Aug. 11, 1995.

* cited by examiner

*Primary Examiner* — Anner Holder
(74) *Attorney, Agent, or Firm* — Wenderoth, Lind & Ponack, L.L.P.

(57) ABSTRACT

Video signal coding apparatus includes a quantization unit which quantizes a luminance signal of each of a first picture and a second picture coded after the first picture, and quantizes a chrominance signal of each of the first picture and the second picture. A code amount obtainment unit obtains a luminance code amount and a chrominance code amount of each of the first picture and the second picture; and a rate calculation unit calculates a rate of the chrominance code amount with respect to the luminance code amount for each of the first picture and the second picture. A rate control unit changes a coefficient value of at least one of the first matrix and the second matrix used in quantizing the second picture, before the quantization unit quantizes the second picture, so that the rate for the second picture becomes smaller than the rate for the first picture.

6 Claims, 10 Drawing Sheets

| Rate r | ~0.1 | ~0.2 | ~0.3 | 0.3~ |
|---|---|---|---|---|
| Multiplier m | 1 | 2 | 3 | 4 |

| 6 | 13 | 20 | 28 |
|---|----|----|----|
| 13 | 20 | 28 | 32 |
| 20 | 28 | 32 | 37 |
| 28 | 32 | 37 | 42 |

(b)

| 12 | 26 | 40 | 56 |
|----|----|----|----|
| 26 | 40 | 56 | 64 |
| 40 | 56 | 64 | 74 |
| 56 | 64 | 74 | 84 |

(c)

| 1 | 2 | 2 | 3 |
|---|---|---|---|
| 2 | 2 | 2 | 3 |
| 2 | 2 | 2 | 3 |
| 3 | 3 | 3 | 3 |

(d)

| 6 | 26 | 40 | 84 |
|---|----|----|----|
| 26 | 40 | 56 | 96 |
| 40 | 56 | 64 | 111 |
| 84 | 96 | 111 | 126 |

FIG. 4

| Rate r | ~0.1 | ~0.2 | ~0.3 | 0.3~ |
|---|---|---|---|---|
| qP_Offset | 0 | 1~6 | 6~9 | 9~12 | qP_I<30 |
| | 0 | 1~12 | 12 | 12 | 31<qP_I<33 |
| | | | | | 34<qP_I |

(Setting of QP_C = 40 corresponding to multiplier 2 not possible because upper limit of QP_C in FIG. 8 is 39)

FIG. 5

| Rate r | ~0.1 | ~0.2 | ~0.3 | 0.3~ |
|---|---|---|---|---|
| Additional value to QP_Offset | 0 | 1~6 | 6~9 | 9~12 |

| qP_I | <30 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|
| QP_C | =qP_I | 29 | 30 | 31 | 32 | 33 | 34 | 34 | 34 | 35 | 35 | 36 | 36 | 37 | 37 | 37 | 38 | 38 | 38 | 39 | 39 | 39 | 39 |

FIG. 9

When qP_Offset = 0

(a)

|  | Before changing | | After changing | Amount of increase |
|---|---|---|---|---|
| QP_Y | 17 | → | 29 | +12 |
| qP_I | 17 | | 29 | +12 |
| QP_C | 17 | | 29 | +12 |

(b)

|  | Before changing | | After changing | Amount of increase |
|---|---|---|---|---|
| QP_Y | 29 | → | 41 | +12 |
| qP_I | 29 | | 41 | +12 |
| QP_C | 29 | | 36 | +7 |

FIG. 10

VIDEO SIGNAL CODING APPARATUS AND VIDEO SIGNAL CODING METHOD

BACKGROUND OF THE INVENTION (1) Field of the Invention

The present invention relates to a video signal coding apparatus and video signal coding method for coding a video signal, and particularly relates to a rate controlling technique.

(2) Description of the Related Art

In recent years, digitalization of AV information is advancing, and devices that can handle video signals by digitalization are becoming widely popular. Since the amount of information included in a video signal is large, it is a common practice to perform coding while reducing the amount of information, in consideration of recording capacity and transmission efficiency. An international standard developed by a working group called the Moving Picture Experts Group (MPEG) is widely used as a technique for coding video signals.

Here, H.264 (for example, see Non-Patent Reference 1: ITUT-T H.264 (March 2005): Infrastructure of audiovisual services—Coding of moving video, Advanced video coding for generic audiovisual services, and Non-Patent Reference 2: Okubo et al, H.264/AVC Textbook, Impress Company (2004)) which is a standard for coding methods shall be described using FIG. 7.

Figure 7:
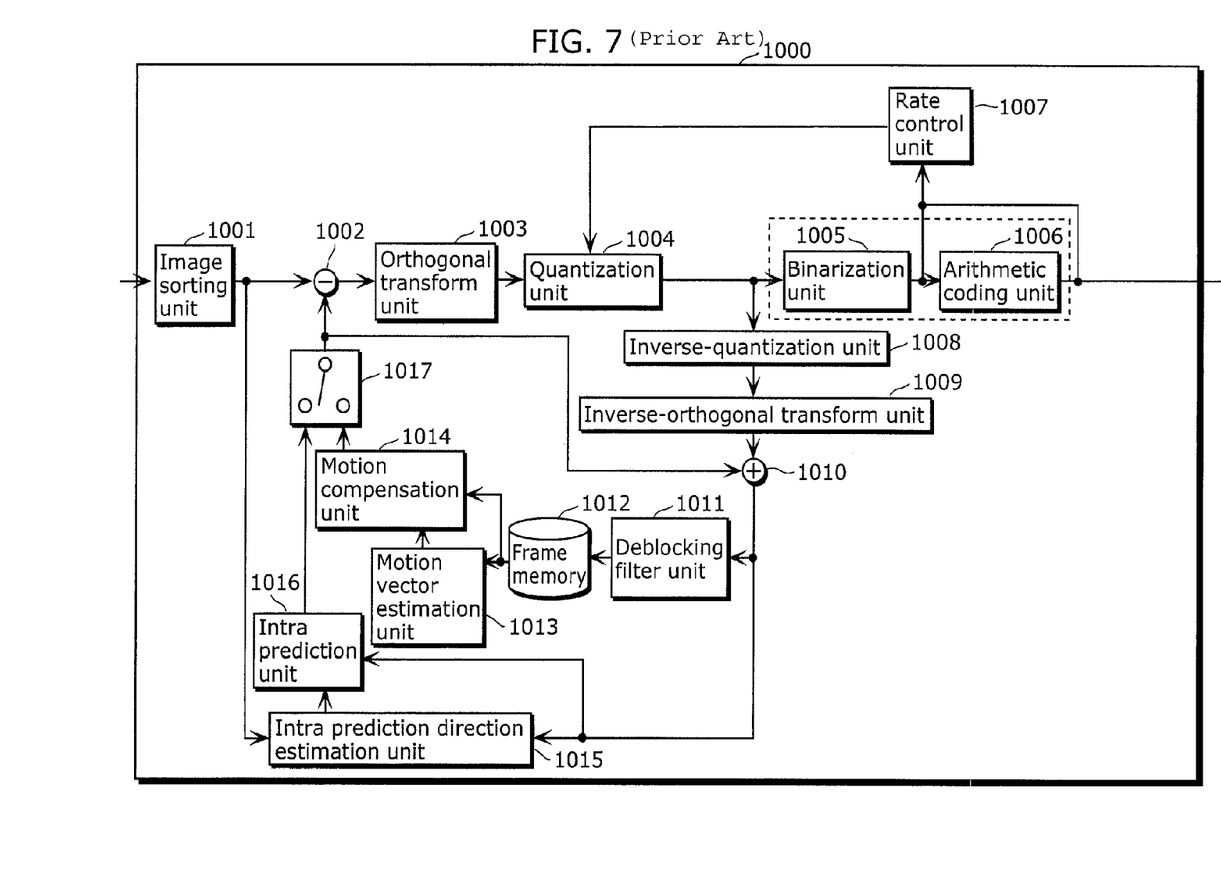
FIG. 7 is a block diagram showing the principal configuration of a conventional coding apparatus.

FIG. 7 is a block diagram showing the principal configuration of a conventional coding apparatus which performs coding according to H.264.

A coding apparatus 1000 shown in FIG. 7 includes an image sorting unit 1001, a subtractor 1002, an orthogonal transform unit 1003, a quantization unit 1004, a binarization unit 1005, an arithmetic coding unit 1006, a rate control unit 1007, an inverse-quantization unit 1008, an inverse-orthogonal transform unit 1009, an adder 1010, a deblocking filter unit 1011, a frame memory 1012, a motion vector estimation unit 1013, a motion compensation unit 1014, an intra predictive direction estimation unit 1015, an intra prediction unit 1016, and a selection unit 1017.

The image sorting unit 1001 sorts, according to the frame order in the coding order, a video signal which includes a luminance signal and a chrominance signal and is inputted to the coding apparatus 1000, and in addition, partitions the sorted video signal into the units of coding, and outputs the result.

When the luminance signal is to be coded, for example, the image sorting unit 1001 sorts the luminance signal according to the frame order in the coding order, partitions the sorted luminance signal into macroblock—(hereafter denoted as "MB") units of 16×16 pixels, and outputs the partitioned luminance signal to the subtractor 1002, the intra prediction unit 1016, and the intra predictive direction estimation unit 1015.

The subtractor 1002 generates a residual MB by calculating a difference between the MB outputted by the image sorting unit 1001 and a predictive MB which is generated by the intra prediction unit 1016 or the motion compensation unit 1014 and outputted by the selection unit 1017. Subsequently, the subtractor 1002 outputs the residual MB to the orthogonal transform unit 1003.

The orthogonal transform unit 1003, generates a Discrete Cosine Transform (DCT) coefficient by performing orthogonal transform on the residual MB outputted by the subtractor 1002, and outputs the DCT coefficient to the quantization unit 1004.

The quantization unit 1004 divides the DCT coefficient outputted by the orthogonal transform unit 1003, using a quantization step determined according to a quantization parameter. In addition, the quantization unit 1004 generates a quantized coefficient by rounding-off the result of the division into an integer value, and outputs the quantized coefficient to the binarization unit 1005 and the inverse-quantization unit 1008.

It should be noted that the relationship between the quantization step and a quantization parameter QP in H.264 is set in such a way that that the signal-to-noise ratio (SN ratio) of the coded signal to be outputted by the coding apparatus 1000 and the quantization parameter QP are almost proportional. It should be noted that, when quantization is performed in the quantization unit 1004, the different quantization parameters QP_Y and QP_C are used for a luminance MB and a chrominance MB, respectively.

Figure 8:
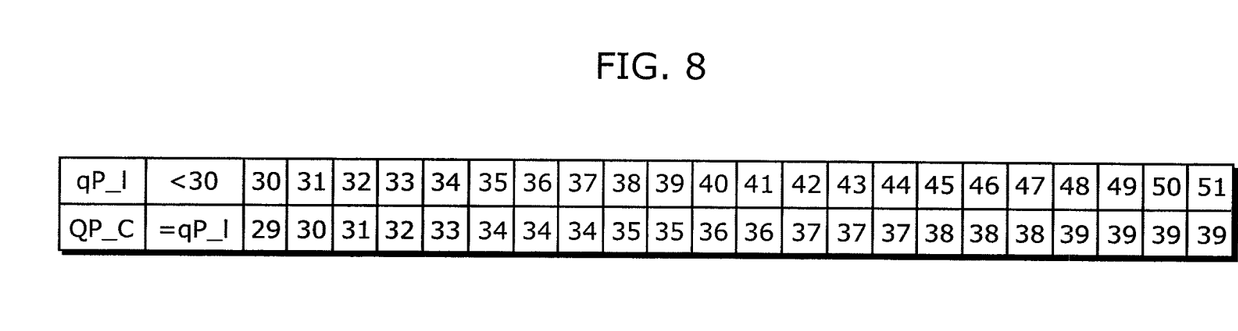
FIG. 8 is a diagram showing a table indicating the relationship between qP_I and QP_C.

Here, QP_C is a variable determined based on qP_I calculated using the subsequent equation, and the table shown in FIG. 8, and is a value that is subordinate to QP_Y. For example, when qP_I is calculated to be 51, QP_C is set as 39. Furthermore, when qP_I is a value smaller than 30, QP_C is set as the same value as qP_I.

$$qP_I = \text{Clip3}(0, 51, QP_Y + qP_{offset}) \quad [\text{Math 1}]$$

It should be noted that Clip3(0, 51, x) is a function which returns a value obtained by clipping x using a lower limit 0 and an upper limit 51. Furthermore, qP_Offset is an offset value defined in H.264, which is added to QP_Y. Here, qP_Offset, which is set in the Cb component and the Cr component of a chrominance signal, is expressed in the subsequent manner.

$$qP_{Offset} = \text{chroma\_}qP\_\text{index\_offset} \quad [\text{Math 2}]$$

$$qP_{Offset} = \text{second\_chroma\_}qP\_\text{index\_offset} \quad [\text{Math 3}]$$

It should be noted that chroma_qP_index_offset is an offset value used in the determination of the QP_C corresponding to the Cb component, and adopts a value ranging from −12 to 12. Furthermore, a second_chroma_qP_index_offset is an offset value used in the determination of the QP_C corresponding to the Cr component, and adopts a value ranging from −12 to 12.

The binarization unit 1005 converts, into binary data, the quantized coefficient expressed by multi-value data and outputted by the quantization unit 1004.

The arithmetic coding unit 1006 generates a coded signal, which is the coded video signal, by performing arithmetic coding on the binary data outputted by the binarization unit 1005, and outputs the coded signal to a recording medium connected inside or outside the apparatus. It should be noted that the aforementioned coded signal includes a coded luminance signal obtained by coding the luminance signal, and a coded chrominance signal obtained by coding the chrominance signal.

The rate control unit 1007 is a control unit which changes the setting of the quantization parameter QP to be used in the quantization unit 1004 in order to keep constant the amount of arithmetic code generated by the arithmetic coding unit 1006, while upholding conformance to the aforementioned standard.

Specifically, the rate control unit 1007 changes the setting of the quantization parameter QP by using the amount of binary code outputted by the binarization unit 1005 and the amount of arithmetic code outputted by the arithmetic coding unit 1006.

A method of performing rate control using the relationship between the binary code amount and the arithmetic code amount in the rate control unit 1007 is disclosed, for example, in Patent Reference 1 (Japanese Unexamined Patent Application Publication No. 2007-158430). In the method disclosed in Patent Reference 1, an estimate arithmetic code amount of a current picture is obtained from the relationship of a past binary code amount and arithmetic code amount, and the quantization parameter is determined by assuming the estimate arithmetic code amount to be the generated code amount for the current picture.

Furthermore, the method below is available as a method of determining the quantization parameter QP from the estimate arithmetic code amount, that is, the generated code amount for each picture. In this method, the allocated code amount T for each picture type is calculated under a condition that (complexity)=(picture generated code amount)×(inter-picture average quantization step) is constant for the same scene. In addition, an accumulated amount d in a virtual buffer is calculated using the difference between such allocated code amount T and an actual generated code amount B, and the quantization parameter is determined based on this accumulated amount d.

The inverse-quantization unit 1008 restores the quantized coefficient outputted by the quantization unit 1004 to the DCT coefficient, by performing inverse-quantization on the quantized coefficient, and outputs the DCT coefficient to the inverse-orthogonal transform unit 1009.

The inverse-orthogonal transform unit 1009 restores the DCT coefficient outputted by the inverse-quantization unit 1008 to the residual MB by performing inverse-orthogonal transform on the DCT coefficient, and outputs the residual MB to the adder 1010.

The adder 1010 generates a decoded MB by adding the residual MB outputted by the inverse-orthogonal transform unit 1009 and the predictive MB, which is generated by the intra prediction unit 1016 or the motion compensation unit 1014, that is outputted by the selection unit 1017, and outputs the decoded MB to the deblocking filter unit 1011, the intra predictive direction estimation unit 1015, and the intra prediction unit 1016.

The deblocking filter unit 1011 performs deblocking filtering on the MB boundaries in the decoded MBs outputted by the adder 1010, and outputs the result to the frame memory 1012.

The frame memory 1012 accumulates the decoded MB outputted by deblocking filter unit 1011. The frame memory 1012 is implemented using a recording medium such as a flash memory, a DRAM, or a ferroelectric memory.

The motion vector estimation unit 1013 estimates the motion vector for the decoded MB accumulated in the frame memory 1012, based on the current MB to be coded. It should be noted that, in the case of the H.264 standard, seven types of processing sizes are defined for the processing size of the MB to be processed by the motion vector estimation unit 1013. The motion vector estimation unit 1013 selects one from these seven types, for each MB.

The motion compensation unit 1014 generates a predictive MB by performing motion compensation on the decoded MB accumulated in the frame memory 1012, based on the motion vector estimated by the motion vector estimation unit 1013

The intra predictive direction estimation unit 1015 estimates the prediction mode to be applied in the intra prediction, based on the decoded MB outputted by the adder 1010 and the MB outputted by the image sorting unit 1001. Subsequently, the intra predictive direction estimation unit 1015 outputs information indicating the estimated prediction mode to the intra prediction unit 1016.

The intra prediction unit 1016 generates a predictive MB by performing intra prediction on the decoded MB outputted by the adder 1010. Subsequently, the intra prediction unit 1016 outputs the generated predictive MB to the selection unit 1017.

The selection unit 1017 selects one predictive MB out of the predictive MBs outputted respectively by the intra prediction unit 1016 and the motion compensation unit 1014, and outputs the selected predictive MB to the subtractor 1002.

The rate control unit 1007 of the conventional coding apparatus 1000 configured in the above-described manner uses a rate control method which makes use of the property in which the product of the quantization step and the code amount of the video signal outputted by the coding apparatus 1000 is constant for the same scene.

SUMMARY OF THE INVENTION

Here, the quantization method in the conventional H.264 is characterized in that, when the qP_I of a certain picture (preceding picture) adopts a value of approximately 30, the amount of increase between the QP_C of the preceding picture and the QP_C of a picture (subsequent picture) coded after the preceding picture becomes comparatively small depending on the QP_Y before changing, that is the QP_Y of the preceding picture.

Figure 9:
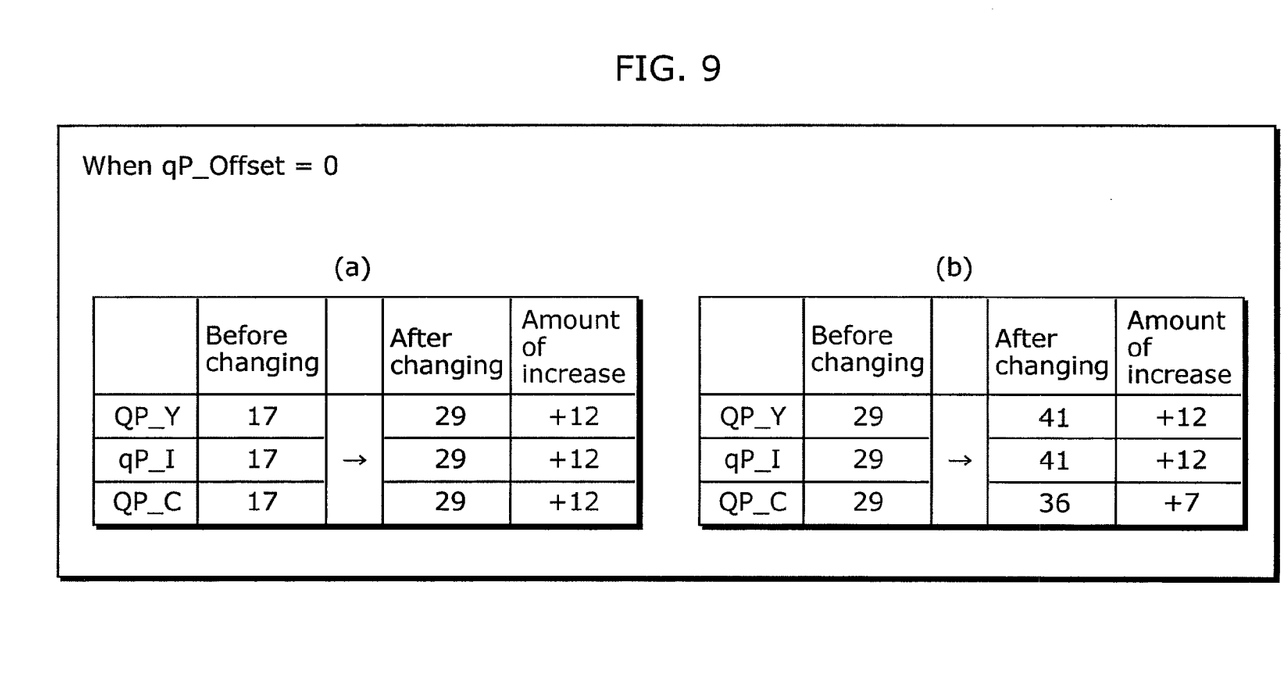
FIG. 9 is a diagram for describing the amount of increase of QP_C, qP_I, and QP_Y.

For example, as shown in FIG. 9, when (a) QP_Y before changing is 17 and the amount of increase between QP_Y after changing is +12, the amount of increase of QP_C is +12. However, when (b) QP_Y before changing is 29 and the amount of increase between QP_Y after changing is +12, the amount of increase of QP_C is +7.

Figure 10:
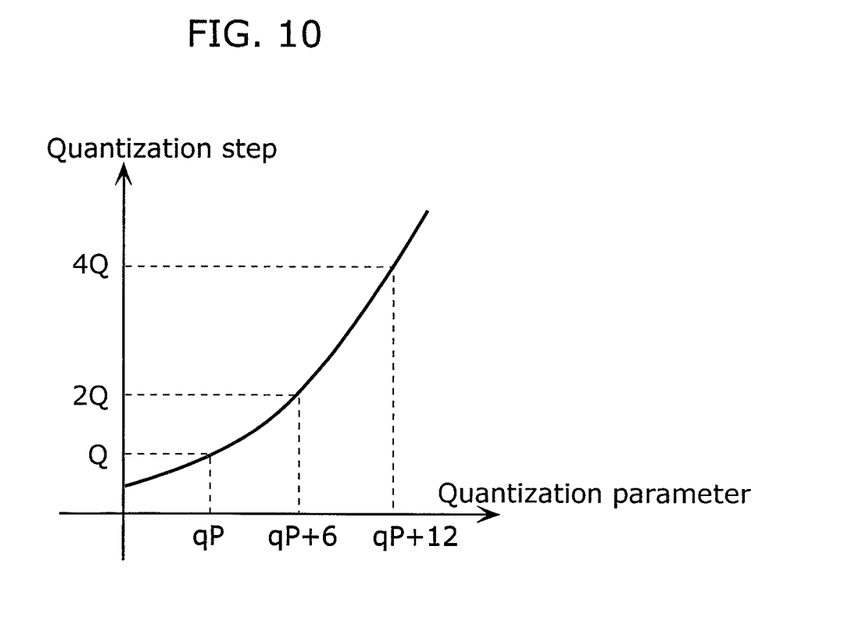
FIG. 10 is a diagram showing the relationship between a quantization parameter and a quantization step.

Furthermore, the quantization parameter and quantization step in H.264 have the relationship shown in FIG. 10. As such, when the amount of increase of QP_Y is +12, the quantization step is quadrupled. However, when the amount of increase of QP_C is +7, the quantization step is more than double (approximately equal to 2.24), which is a value that is less than the quadruple expected.

Here, it is preferable that the rate control unit 1007 reduces the code amount to ¼ by adjusting the quantization parameter and quadrupling the quantization step to be applied to the chrominance signal and the luminance signal. However, as described above, the quantization step for the code amount of the chrominance signal is only doubled, and thus the code amount of the chrominance signal after coding only becomes approximately ½. Specifically, with the conventional coding apparatus 1000, there is the problem that the rate control operation cannot achieve the desired operation.

Furthermore, as can be understood from [Math 1] and FIG. 8, when qP_I is 30 or higher, there is a tendency for QP_C to become a smaller value compared to QP_Y as qP_I becomes larger. Specifically, there is a tendency for the quantization step to be applied to the chrominance signal to become a comparatively small value and for the code amount of the chrominance signal to increase. As such, when qP_I is 30 or higher, the code amount that can be allotted to the luminance signal, which has a bigger impact on the subjective image quality, becomes relatively small and, as a result, there is the problem that the subjective image quality deteriorates.

It should be noted that Patent Reference 2 (Japanese Unexamined Patent Application Publication No. 7-212598) discloses the calculation of the allocated code amounts of the luminance signal and the chrominance signal. However, in such allocation method, the allocation is determined based on the rate between the luminance and chrominance generated code amounts obtained in a first coding. Specifically, as in the subsequent equation, the luminance code amount (NY1, NY2, NY3, and NY4) of each of the four image regions and the chrominance code amount (NC1, NC2, NC3, and NC4) of each of the four image regions are calculated, and a rate N_{Y/C} is further calculated.

$$N_{\frac{Y}{C}} = \frac{1}{4}\sum_{i=1}^{4}\left(\frac{NY_i}{NC_i}\right) \qquad \text{[Math 4]}$$

Subsequently, a luminance allocated code amount N_{Yt} and a chrominance allocated code amount N_{Ct} are calculated based on such rate, using the equation below.

$$N_{Y_t} = N_t \left(\frac{N_{\frac{Y}{C}}}{N_{\frac{Y}{C}}+1}\right) \qquad \text{[Math 5]}$$

$$N_{C_t} = N_t \left(\frac{1}{N_{\frac{Y}{C}}+1}\right) \qquad \text{[Math 6]}$$

However, in the case of the processing described in Patent Reference 2, the code amounts are allocated so that the rate between the code amount of the luminance signal and the code amount of the chrominance signal in the generated code amount of a certain picture becomes the same for the subsequent picture. In other words, the perspective of maintaining or improving image quality is not taken into consideration in the allocation of code amounts.

Consequently, the present invention is conceived in view of the above described conventional problems and has as an object to provide a video signal coding apparatus and video signal coding method which, in the rate control performed during the coding of a video signal including a luminance signal and a chrominance signal, appropriately allocates code amounts for the luminance signal and the chrominance signal so that excellent image quality can be obtained.

A video signal coding apparatus according to an aspect of the present invention is a video signal coding apparatus which performs coding involving quantization on a video signal including a luminance signal and a chrominance signal, and outputs a coded signal including a coded luminance signal and a coded chrominance signal, the video signal being a signal of a video, the video signal coding apparatus including: a quantization unit configured to quantize a luminance signal of each of a first picture and a second picture using coefficient values indicated in a first quantization matrix, and to quantize a chrominance signal of each of the first picture and the second picture using coefficient values indicated in a second quantization matrix, the first picture and the second picture being included in the video, and the second picture being coded subsequent to the first picture; a code amount obtainment unit configured to obtain a luminance code amount and a chrominance code amount for each of the first picture and the second picture, the luminance code amount indicating a code amount of a coded luminance signal, and the chrominance code amount indicating a code amount of a coded chrominance signal; a rate calculation unit configured to calculate a rate of the chrominance code amount with respect to the luminance code amount of each of the first picture and the second picture, which are obtained by the code amount obtainment unit; and a rate control unit configured to change a coefficient value of at least one of the first quantization matrix and the second quantization matrix to be used in the quantization of the second picture, before the quantization unit quantizes the second picture, so that the rate for the second picture becomes smaller than the rate for the first picture.

Furthermore, a video signal coding method according to an aspect of the present invention is a video signal coding method of performing coding involving quantization on a video signal including a luminance signal and a chrominance signal, and outputting a coded signal including a coded luminance signal and a coded chrominance signal, the video signal being a signal of a video, the video signal coding method including: obtaining a luminance code amount and a chrominance code amount, the luminance code amount indicating a code amount of a coded luminance signal of a first picture, and the chrominance code amount indicating a code amount of a coded chrominance signal of the first picture; calculating a rate of the chrominance code amount with respect to the luminance code amount of the first picture that have been obtained; changing a coefficient value of at least one of: a first quantization matrix to be used in quantization of a luminance signal of a second picture; and a second quantization matrix to be used in the quantization of a chrominance signal of the second picture, so that the rate of a chrominance code amount with respect to a luminance code amount for the second picture becomes smaller than a rate for the first picture, the second picture being coded subsequent to the first picture; and quantizing the luminance signal and the chrominance signal of the second picture using the first quantization matrix and the second quantization matrix after the coefficient value has been changed.

As described above, according to the video signal coding apparatus according to an aspect of the present invention and the video signal coding method according to an aspect of the present invention, it is possible to monitor the chrominance code amount and the luminance code amount in the coded signal to be generated by coding a video signal, and appropriately allocate the subsequent luminance code amount and chrominance code amount depending on the rate between the monitored luminance code amount and the chrominance code amount.

Specifically, it is possible to perform control so as to keep the rate between the luminance code amount and the chrominance code amount within a fixed range. This prevents the occurrence of a situation in which, for example, the increase in the chrominance code amount puts a strain on the luminance code amount. In other words, the balance between the luminance code amount and the chrominance code amount for obtaining excellent image quality is maintained.

FURTHER INFORMATION ABOUT TECHNICAL BACKGROUND TO THIS APPLICATION

The disclosure of Japanese Patent Application No. 2009-025722 filed on Feb. 6, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE INVENTION

A video signal coding apparatus according to an implementation of the present invention is a video signal coding apparatus which performs coding involving quantization on a video signal including a luminance signal and a chrominance signal, and outputs a coded signal including a coded luminance signal and a coded chrominance signal, the video signal being a signal of a video, the video signal coding apparatus including: a quantization unit configured to quantize a luminance signal of each of a first picture and a second picture using coefficient values indicated in a first quantization matrix, and to quantize a chrominance signal of each of the first picture and the second picture using coefficient values indicated in a second quantization matrix, the first picture and the second picture being included in the video, and the second picture being coded subsequent to the first picture; a code amount obtainment unit configured to obtain a luminance code amount and a chrominance code amount for each of the first picture and the second picture, the luminance code amount indicating a code amount of a coded luminance signal, and the chrominance code amount indicating a code amount of a coded chrominance signal; a rate calculation unit configured to calculate a rate of the chrominance code amount with respect to the luminance code amount of each of the first picture and the second picture, which are obtained by the code amount obtainment unit; and a rate control unit configured to change a coefficient value of at least one of the first quantization matrix and the second quantization matrix to be used in the quantization of the second picture, before the quantization unit quantizes the second picture, so that the rate for the second picture becomes smaller than the rate for the first picture.

Furthermore, a video signal coding method according to an implementation of the present invention is a video signal coding method of performing coding involving quantization on a video signal including a luminance signal and a chrominance signal, and outputting a coded signal including a coded luminance signal and a coded chrominance signal, the video signal being a signal of a video, the video signal coding method including: obtaining a luminance code amount and a chrominance code amount, the luminance code amount indicating a code amount of a coded luminance signal of a first picture, and the chrominance code amount indicating a code amount of a coded chrominance signal of the first picture; calculating a rate of the chrominance code amount with respect to the luminance code amount of the first picture that have been obtained; changing a coefficient value of at least one of: a first quantization matrix to be used in quantization of a luminance signal of a second picture; and a second quantization matrix to be used in the quantization of a chrominance signal of the second picture, so that the rate of a chrominance code amount with respect to a luminance code amount for the second picture becomes smaller than a rate for the first picture, the second picture being coded subsequent to the first picture; and quantizing the luminance signal and the chrominance signal of the second picture using the first quantization matrix and the second quantization matrix after the coefficient value has been changed.

According to the above-described video signal coding apparatus and the video signal coding method, it is possible to monitor the chrominance code amount and the luminance code amount in the coded signal to be generated by coding a video signal, and appropriately allocate the subsequent luminance code amount and chrominance code amount depending on the rate between the monitored luminance code amount and the chrominance code amount.

Furthermore, in a video signal coding apparatus according to an implementation of the present invention, when the rate for the first picture is larger than a first threshold, the rate control unit may be configured to decrease the rate for the second picture to a rate that is smaller than the rate for the first picture by increasing the coefficient value of the second quantization matrix to be used in the quantization of the second picture.

Compared to the conventional video signal coding apparatus, this configuration produces the advantageous effect of being able to resolve an unbalanced state in which a larger code amount is allocated to the chrominance signal than to the luminance signal, for example. Furthermore, the appropriateness of the code amount allocation between the luminance signal and the chrominance signal can be judged through the simple process of comparing the rate therebetween and a threshold.

Furthermore, in a video signal coding apparatus according to an implementation of the present invention, the rate control unit may be configured to increase the coefficient value of the second quantization matrix by multiplying the coefficient value of the second quantization matrix by a multiplier value corresponding to the rate for the first picture.

According to this configuration, a configuration for changing the coefficient value of the second quantization matrix, for example, can be easily implemented.

Furthermore, in a video signal coding apparatus according to an implementation of the present invention, the second quantization matrix may include one of the coefficient values for each of frequency components of the chrominance signal, the rate control unit may be configured to multiply the coefficient value corresponding to one of the frequency components by a multiplier value for the one of the frequency components, and among the multiplier values each of which is for a corresponding one of the frequency components, a multiplier value for a low frequency component may be smaller than a multiplier value for a high frequency component.

According to this configuration, it is possible to suppress the overall code amount while minimizing the deterioration of an image of a low frequency component which has the most impact visually on humans.

Furthermore, in a video signal coding apparatus according to an implementation of the present invention, when the rate for the first picture is smaller than a second threshold which is smaller than the first threshold, the rate control unit may be configured to increase the rate for the second picture to a rate that is larger than the rate for the first picture, by increasing the coefficient value of the first quantization matrix to be used in coding the second picture.

According to this configuration, it is possible to prevent the occurrence of a situation in which, for example, the increase in the luminance code amount puts a strain on the chrominance code amount. Furthermore, the appropriateness of the code amount allocation between the luminance signal and the chrominance signal can be judged through the simple process of comparing the rate therebetween and a threshold.

In addition, the control rule can be simplified since there are only three conditional branches according to the threshold judgment.

Furthermore, in a video signal coding apparatus according to an implementation of the present invention, the rate control unit may be configured to change the coefficient value of the second quantization matrix to be used in the quantization of the second picture, by selecting, from among second quantization matrices corresponding to rates that can be calculated as the rate for the first picture, a second quantization matrix corresponding to the rate for the first picture calculated by the rate calculation unit, and causing the quantization unit to use the selected second quantization matrix.

According to this configuration, it is possible to reduce the processing amount in the video signal coding apparatus since, for example, the multiplication process for changing the second quantization matrix becomes unnecessary.

Furthermore, in a video signal coding apparatus according to an implementation of the present invention, when the rate for the first picture is larger than a first threshold, the rate control unit may be configured to decrease the rate for the second picture to a rate that is smaller than the rate for the first picture by decreasing the coefficient value of the first quantization matrix to be used in the quantization of the second picture.

In this manner, even when changing the first quantization matrix used in the quantization of the luminance signal, it is possible to resolve an unbalanced state in which, for example, a larger code amount is allocated to the chrominance signal than the luminance signal.

Furthermore, the present invention can also be implemented as a semiconductor circuit having the characteristic components included in the video signal coding apparatus in the present invention.

Furthermore, the present invention can also be implemented as a program which causes a computer to execute the characteristic processes included in the video signal coding method in the present invention.

Hereinafter, an embodiment of the present invention shall be described with reference to the drawings.

Figure 1:
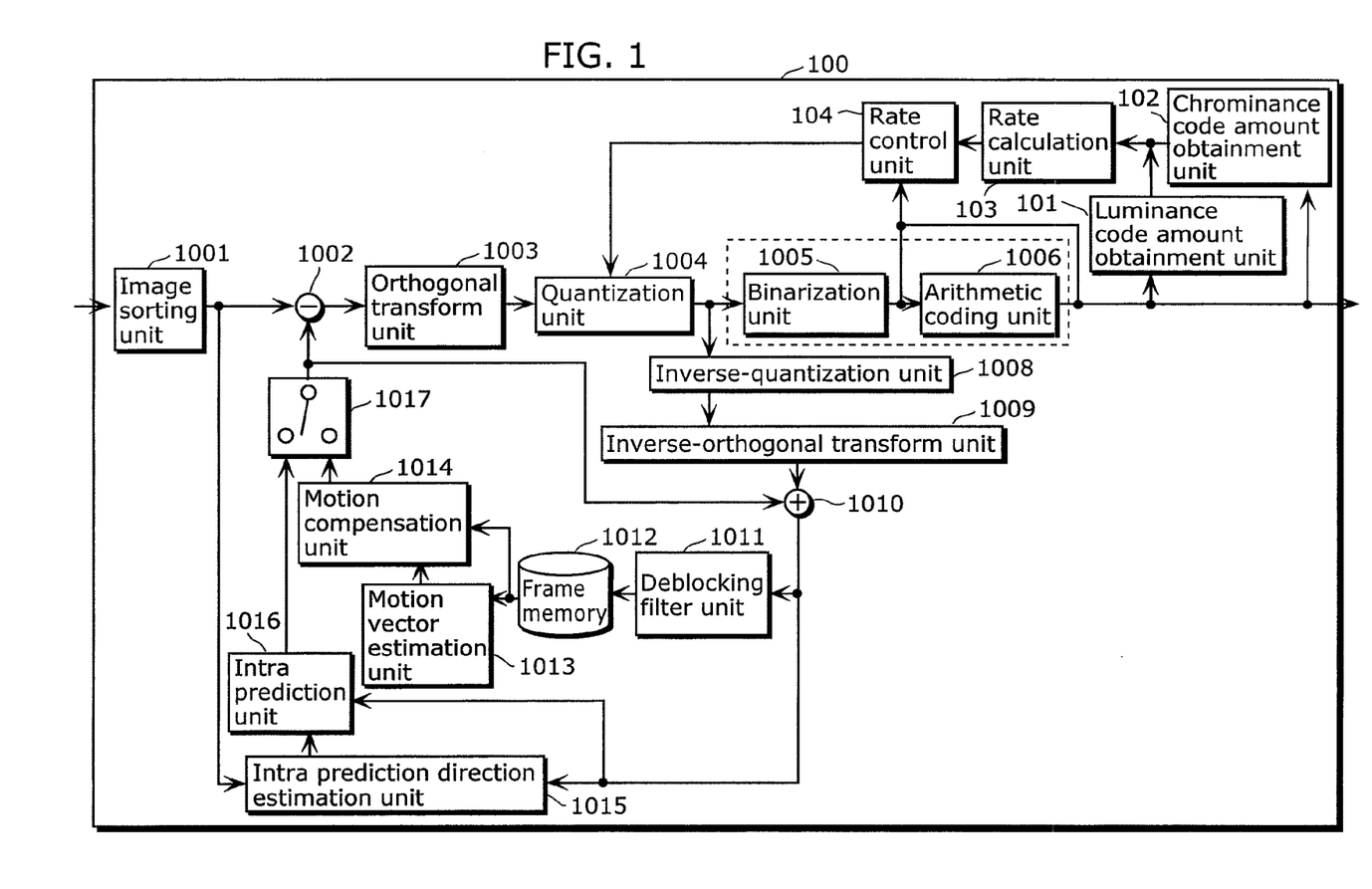
FIG. 1 is a block diagram showing the principal configuration of a coding apparatus in an embodiment of the present invention.

FIG. 1 is a block diagram showing the principal configuration of a coding apparatus 100 in an embodiment of the present invention. It should be noted that each function block included in the coding apparatus 100 that is the same as a function block in the conventional coding apparatus 1000 shown in FIG. 7 is given the same numerical reference, and description thereof shall be omitted.

Compared to the conventional coding apparatus 1000, the coding apparatus according to the embodiment further includes a luminance code amount obtainment unit 101, a chrominance code amount obtainment unit 102, and a rate calculation unit 103, and includes a rate control unit 104 in place of the rate control unit 1007.

The luminance code amount obtainment unit 101 calculates the luminance code amount which is the summation of respective luminance signals for each picture, which are included in a signal outputted by the arithmetic coding unit 1006. Subsequently, the luminance code amount obtainment unit 101 outputs the calculated luminance code amount to the rate calculation unit 103.

The chrominance code amount obtainment unit 102 calculates the chrominance code amount which is the summation of respective chrominance signals for each picture, which are included in the signal outputted by the arithmetic coding unit 1006. Subsequently, the chrominance code amount obtainment unit 101 outputs the calculated chrominance code amount to the rate calculation unit 103.

It should be noted that the code amount obtainment unit in the video signal coding apparatus in the present invention is implemented through the luminance code amount obtainment unit 101 and the chrominance code amount obtainment unit 102.

Based on the code amounts outputted respectively by the luminance code amount obtainment unit 101 and the chrominance code amount obtainment unit 102, the rate calculation unit 103 calculates, using [Math 7], a rate r which is the rate of the chrominance code amount with respect to the luminance code amount. Subsequently, the rate calculation unit 103 outputs the calculated rate r to the rate control unit 104.

$$r = \text{(chrominance code amount)} \div \text{(luminance code amount)} \quad \text{[Math 7]}$$

It should be noted that the rate calculation unit 103 may calculate the rate r using a weighted value of the chrominance code amount or the luminance code amount.

In addition to the operations performed by the conventional rate control unit 1007, the rate control unit 104 performs the changing of the quantization matrix to be used in the quantization unit 1004, based on the rate r calculated by the rate calculation unit 103. Specifically, the rate control unit 104 changes a coefficient value of at least one quantization matrix out of quantization matrices used in the respective quantizations of the luminance signal (Y) and the chrominance signal (Cb and Cr).

The quantization unit 1004 multiplies the coefficient values of the quantization matrix that has been changed by the rate control unit 104 by the quantization step obtained from QP_C or QP_Y. In addition, the quantization unit 1004 generates a quantized coefficient by dividing the DCT coefficient outputted by the orthogonal transform unit 1003 by the result of the multiplication, and rounding off the result to an integer value.

Hereinafter, the method of changing the quantization matrix used in the rate control unit 104 shall be described with reference to the Drawings.

As a method of changing the quantization matrix, there is a method which increases one or more coefficient values out of coefficient values indicated in a quantization matrix used in the quantization of a chrominance signal, when the rate r is larger than a threshold r_H. With this, the rate of the chrominance code amount with respect to the luminance code amount for a picture to be coded subsequently becomes smaller than the rate r.

It should be noted that increasing one or more coefficient values out of coefficient values for each frequency component, included in the quantization matrix shall be referred to hereafter as "(to) scale-up the quantization matrix". Furthermore, decreasing one or more coefficient values out of coefficient values for each frequency component, included in the quantization matrix shall be referred to hereafter as "(to) scale-down the quantization matrix".

Furthermore, the quantization matrix used in the quantization of a luminance signal may be scaled-down when the rate r is larger than a threshold r_H. By doing so, the rate of the chrominance code amount with respect to the luminance code amount for a picture to be coded subsequently likewise becomes smaller than the rate r.

Furthermore, there is also a method which scales-up the quantization matrix used in the quantization of a luminance signal, when the rate r is smaller than a threshold r_L (<r_H). With this, the rate of the chrominance code amount with respect to the luminance code amount for a picture to be coded subsequently becomes larger than the rate r. It should be noted that, when r is smaller than a threshold r_H and larger than a threshold r_L, the changing of the quantization matrix need not be performed.

It should be noted that r_H is an example of a first threshold in the video signal coding apparatus in the present invention, and r_L is an example of a second threshold in the video signal coding apparatus in the present invention.

Furthermore, the quantization matrix used in the quantization of a luminance signal is an example of a first quantization matrix in the video signal coding apparatus in the present invention. Furthermore, the quantization matrix used in the quantization of a chrominance signal is an example of a second quantization matrix in the video signal coding apparatus in the present invention.

Furthermore, with regard to the scaling-up of a quantization matrix, any method may be adopted as long as it is a method which increases one or more coefficient values out of the coefficient values indicated in the quantization matrix.

Hereinafter, a number of methods for scaling-up a quantization matrix shall be described with reference to the Drawings.

Figure 2:
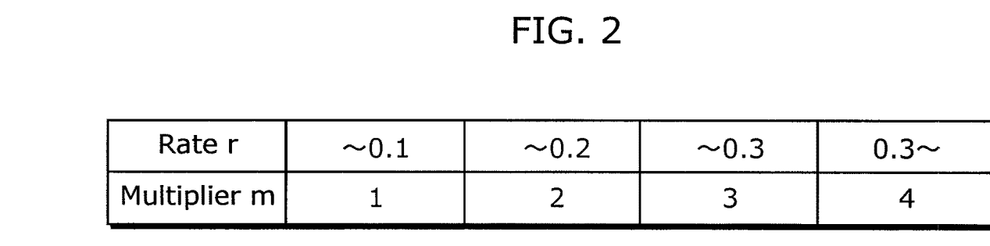
FIG. 2 is a diagram showing an example of a table in which a rate r and a multiplier value m are tied.

FIG. 2 is a diagram showing an example of a table in which the rate r and a multiplier value m are tied.

The multiplier value m in the table shown in FIG. 2 is an arbitrarily set parameter.

The rate control unit 104 performs the scaling-up of the quantization matrix using the table shown in FIG. 2. Specifically, in performing the scale-up, the rate control unit 104 obtains a scaled-up quantization matrix by multiplying the respective coefficient values of the quantization matrix serving as the reference by the multiplier value tied to the rate r calculated by the rate calculation unit 103.

Figure 3:
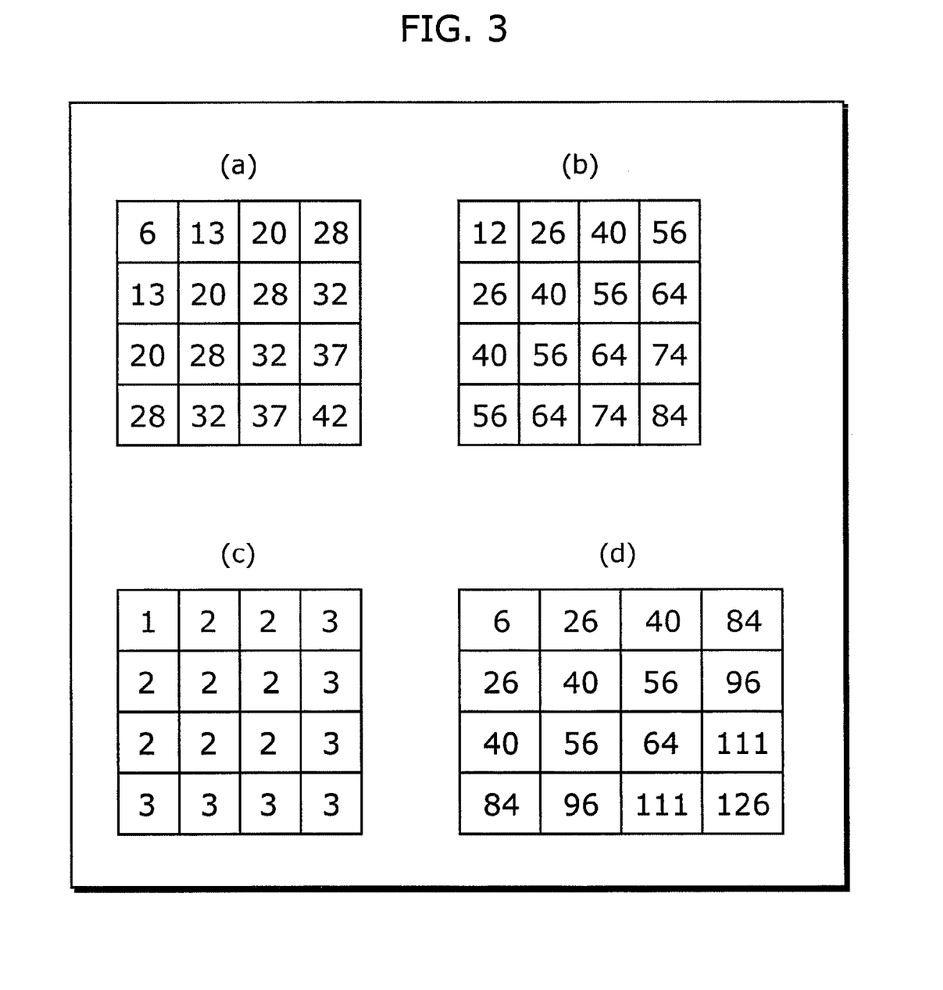
FIG. 3 is a diagram showing a quantization matrix which serves as a reference, a quantization matrix after the scale-up using the table shown in FIG. 2, a multiplier value matrix, and a quantization matrix after the scale-up using the multiplier value matrix.

Here, a specific example of the scaling-up of a quantization matrix by the rate control unit 104 shall be described using FIG. 3.

FIG. 3 is a diagram showing: a quantization matrix which serves as a reference (a); a quantization matrix after the scale-up using the table shown in FIG. 2 (b); a multiplier value matrix (c); and a quantization matrix after the scale-up using the multiplier value matrix (c), (d);

For example, it is assumed that the rate calculation unit 103 has calculated r=0.18. In this case, the rate control unit 104 obtains, from the table shown in FIG. 2, the multiplier value "2" which corresponds to r=0.18. Subsequently, the rate control unit 104 calculates the quantization matrix (b) shown in FIG. 3 by multiplying the respective coefficient values of the reference quantization matrix (a) shown in FIG. 3 by "2".

It should be noted that the determination of the multiplier value to be used in the scale-up is not limited to the method which performs the determination based on the table shown in FIG. 2. For example, determination may be performed based on the linear function shown in [Math 8].

(multiplier value $m$)=$Pa$×(rate $r$)+$Pb$     [Math 8]

It should be noted that Pa and Pb are parameters that can be set arbitrarily.

Furthermore, the multiplier value to be used in the scale-up may be defined as a different value for each frequency component of the quantization matrix. In this case, by performing setting so that the multiplier value of a low frequency component has a smaller value than that of a high frequency component, it is possible to suppress the overall code amount while minimizing the deterioration of an image of a low frequency component which has the most impact visually on humans.

Here, as a specific example, it is possible to set a different multiplier value for each frequency component of the reference quantization matrix (a) shown in FIG. 3. In this case, for example, the multiplier value table (c) shown in FIG. 3 is set. The multiplier value table (c) is stored, for example, in a predetermined storage region included in the rate control unit 104. The rate control unit 104 multiplies the each of the coefficient values of the reference quantization matrix (a) by a corresponding one of the multiplier values shown in the multiplier value table (c). As a result of the multiplication, the quantization matrix (d) shown in FIG. 3 is obtained.

It should be noted that it is also acceptable to predefine quantization matrices obtained by performing the scale-up in stages beforehand and pre-associate such quantization matrices with the rates that can be calculated by the rate calculation unit 103. In this case, the rate control unit 104 selects, from among the quantization matrices, the quantization matrix corresponding to the rate r calculated by the rate calculation unit 103, and the selected quantization matrix is used in the quantization of the luminance signal or the chrominance signal by the quantization unit 1004. Accordingly, in the rate control unit 104, the multiplication process for generating the quantization matrix after changing becomes unnecessary, and thus the amount of processing can be reduced.

It should be noted that, when performing coding according to H.264, the coding apparatus 100 may adjust the chrominance code amount and the luminance code amount that are to be outputted from the coding apparatus 100, by changing the quantization step through the adjustment of the quantization parameter.

For example, the rate control 104 may adjust the chrominance code amount or the luminance code amount by changing the qP_Offset in the quantization parameter to be set in the quantization unit 1004.

Here, in H.264, the relationships shown in [Math 1] and FIG. 10 are defined in the standard. As such, for example, when it is desired to obtain the same effect as when the multiplier value is set as 2, it is sufficient to set qP_Offset as 6.

Figure 4:
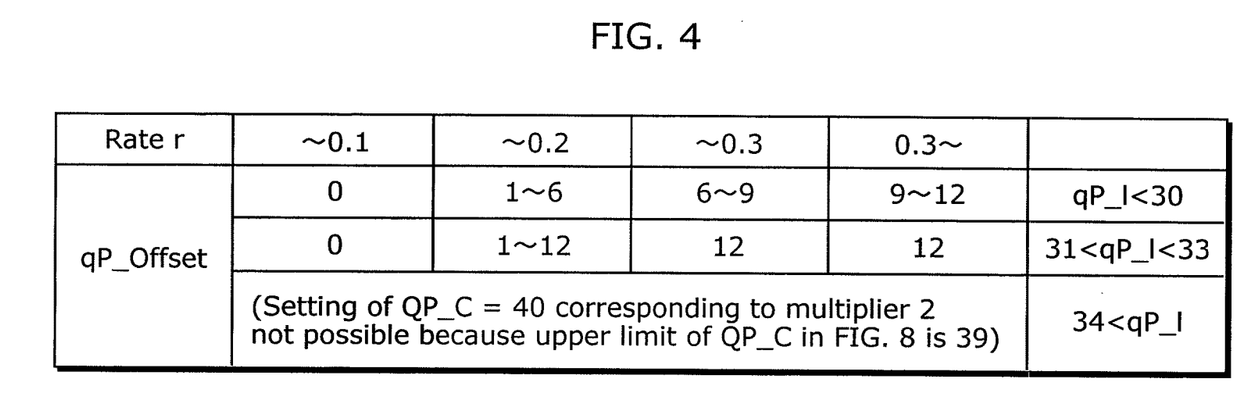
FIG. 4 is a diagram showing a table indicating the association between rate r and qP_Offset, that is dependent on qP_I, in the embodiment.

Furthermore, in order to perform processing more simply, the rate control unit 104 may use a table such as that shown in FIG. 4. Specifically, depending on the r calculated by the rate calculation unit 103, the rate control unit 104 adjusts the quantization parameter using any value included in the range of the qP_Offset that is tied with the range of r indicated in the table shown in FIG. 4. The rate control unit 104 can also change the quantization step using such a process.

For example, when the rate calculation unit 103 calculates r to be 0.18, the rate control unit 104 uses a numerical value included in a range from 1 to 6 to obtain the quantization step.

Here, when qP_I is comparatively large, for example, when qP_I is larger than 30, QP_C does not increase by 6 even when qP_I increases by 6, as shown in [Math 1] and FIG. 8. However, since the processing using the table shown in FIG. 4 enables the selection of qP_Offset from within a predetermined range, it is possible to appropriately control the code amount to be outputted by the coding apparatus 100.

However, as shown in FIG. 8, the upper limit for QP_C is 39. As such, when qP_I is larger than 34, it is not possible to set a qP_Offset equivalent to multiplier value=2 for the coefficient values of the quantization matrix, that is, a qP_Offset which is equivalent to +6 in terms of the quantization parameter and for which QP_C is 40.

Consequently, for example, the value of a default qP_Offset is adjusted so that qP_I does not become a certain value or larger such as a value equal to or larger than 34. Specifically, it is sufficient to set, as a default, qP_Offset=−12 and, with respect to this, set for example the value resulting from adding the additional value obtained from FIG. 5 to the default qP_Offset, as the qP_Offset used in the actual processing.

It should be noted that, when the default value of qP_Offset is set to "−12", that is, when the quantization step is set to ¼, it is necessary to quadruple the quantization matrix to be set in the quantization unit 1004 in order for the output result from the quantization unit 1004 to be the same as that when the usual qP_Offset is used. Furthermore, in such a case, in order for qP_I to become 34 or larger, it is possible to set the case where QP_Y is 46 or larger according to [Math 1].

Figure 6:
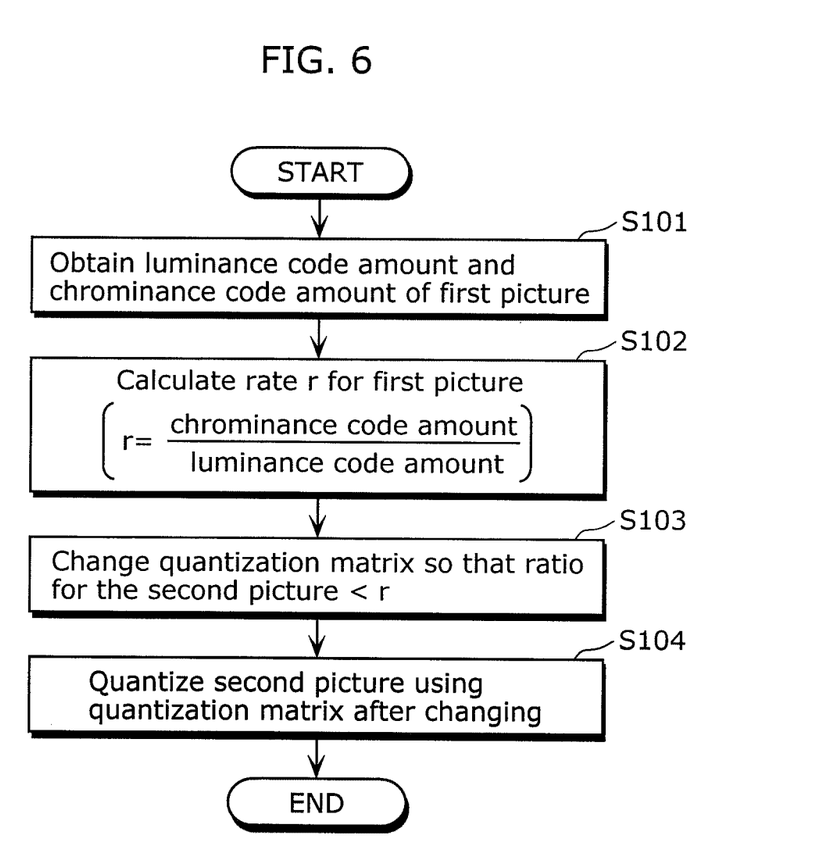
FIG. 6 is a flowchart showing an example of the flow of the operation of the coding apparatus in the embodiment.

Next, an example of the flow of the operation of the coding apparatus 100 according to the embodiment shall be described using FIG. 6.

FIG. 6 is a flowchart showing an example of the flow of the operation of the coding apparatus 100 in the embodiment.

The luminance code amount obtainment unit 101 obtains the luminance code amount of one picture (first picture). Furthermore, the chrominance code obtainment unit 102 obtains the chrominance code amount of the first picture (S101).

The rate calculation unit 103 calculates the rate of the chrominance code amount with respect to the luminance code amount for the first picture (S102).

In order that the rate of the chrominance code amount with respect to the luminance code amount for a picture (second picture) that is coded subsequent to the first picture becomes a smaller value than such rate for the first picture, the rate control unit 104 changes a coefficient value of at least one of the quantization matrix used in the quantization of the luminance signal of the second picture and the quantization matrix used in the quantization of the chrominance signal of the second picture (S103).

After the above-described coefficient value is changed by the rate control unit 104, the quantization unit 1004 quantizes the luminance signal and the chrominance signal of the second picture using the first quantization matrix and the second quantization matrix (S104).

According to the coding apparatus 100 in the embodiment, the rate of the chrominance code amount with respect to the luminance code amount for the first picture is calculated in the above-described manner. In addition, the quantization matrix is changed so that the rate of the chrominance code amount with respect to the luminance code amount for the second picture becomes smaller than the rate for the first picture.

With this, when plural pictures are coded in succession, the rate of the chrominance code amount with respect to the luminance code amount can be kept within a fixed range.

For example, when the chrominance code amount becomes extremely large, the coding apparatus 100 can scale-up the quantization matrix to be used in the quantization of the chrominance signal. With this rate control operation, the subsequent chrominance code amount decreases. With this, the luminance code amount becomes relatively larger, and as a result, the subjective image quality is improved.

In addition, by setting the qP_Offset in the H.264 standard to a small value (for example, "−12"), it is possible to avoid, as much as possible, having to use a qP_I that is 34 or larger which causes problems. With this, the rate control can be performed appropriately.

It should be noted that, as described above, since problems occur when qP_I is 34 or larger, it is acceptable to activate the scale-up processing using the multiplier values shown in the table in FIG. 2 only when qP_I≥34.

Furthermore, although the rate r is calculated using the luminance code amount and the chrominance code amount in the embodiment, it is sufficient that the luminance code amount and the chrominance code amount can be calculated based on information after quantization.

For example, the summation of the luminance signal for each picture outputted by the quantization unit 1004 may be handled as the luminance code amount, and the summation for each picture of the chrominance signal outputted by the quantization unit 1004 may be handled as the chrominance code amount. Specifically, the rate r may be calculated from such luminance code amount and such chrominance code amount.

Furthermore, the rate r may be calculated from the code amount corresponding to the luminance signal and the code amount corresponding to the chrominance signal, out of the binary code amount outputted but by the binarization unit 1005, instead of the output of the arithmetic coding unit 1006.

Furthermore, the U component and the V component of chrominance may be handled independently as the chrominance code amount used in the calculation of the rate r by the rate calculation unit 103. In this case, the scale-up of the quantization matrix to be applied to the U signal is performed based on a rate r_U calculated from the code amount of the U component of chrominance and the luminance code amount.

Figure 5:
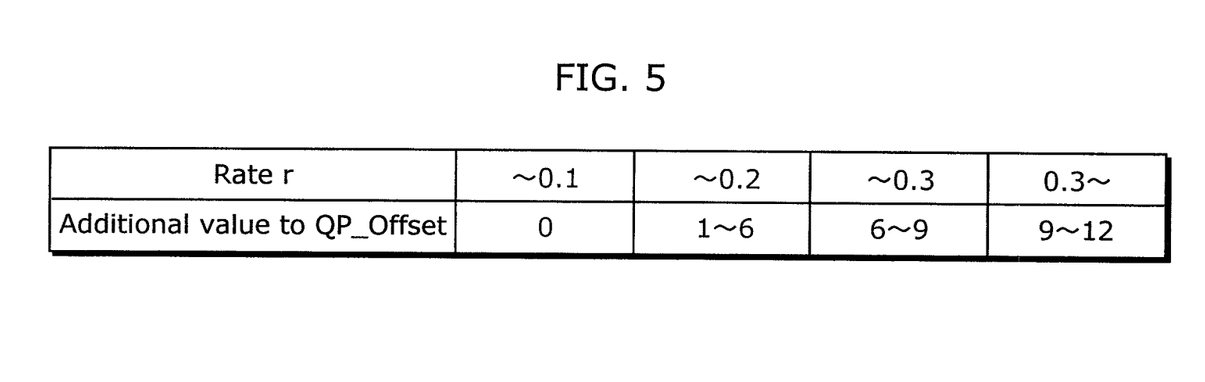
FIG. 5 is a diagram showing a table indicating the association between rate r and the additional value to qP_Offset, in the embodiment.

Specifically, the quantization matrix used in the quantization of the U signal is multiplied by the multiplier or, in the case of H.264, chroma_qp_index_offset, which is the qP_Offset that is equivalent to the U signal, is set based on the tables in FIG. 4 and FIG. 5.

The same is true for the V component; the scale-up of the quantization matrix to be applied to the V signal is performed based on a rate r_V calculated from the code amount of the V component of chrominance and the luminance code amount. Specifically, the quantization matrix used in the quantization of the V signal is multiplied by the multiplier or, in the case of H.264, second_chroma_qp_index_offset, which is the qP_Offset that is equivalent to the V signal, is set based on the tables in FIG. 4 and FIG. 5.

Furthermore, part or all of the components of the coding apparatus 100 in the embodiment (see FIG. 1) can be implemented using one or several integrated circuits.

Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

According to the video signal coding apparatus and the video signal coding method according to the present invention, it is possible to monitor the chrominance code amount and the luminance code amount, and appropriately allocate the subsequent luminance code amount and chrominance code amount depending on the rate of the monitored luminance code amount and chrominance code amount. With this, it is possible to solve a problem in which, for example, the luminance code amount becomes extremely small in comparison to the chrominance code amount and image deterioration occurs. The present invention particularly produces a remarkable advantageous effect in low bit rates, and is an invention capable of prolonging the recording time of video that can be recorded in a recording medium. Therefore, the industrial applicability of the present invention is high.

What is claimed is:

1. A video signal coding apparatus which codes a video signal including a luminance signal and a chrominance signal, and outputs a coded signal, the video signal coding apparatus comprising:
   a coding unit configured to perform coding of at least quantization on a picture included in the video signal, and an output of the coded signal;
   a code amount obtainment unit configured to obtain a luminance code amount and a chrominance code amount which are two code amounts included in the coded signal output from the coding unit, the luminance code amount being a code amount related to the luminance signal, and the chrominance code amount being a code amount related to the chrominance signal;
   a calculation unit configured to compare the luminance code amount with the chrominance code amount obtained by the code amount obtainment unit based on a ratio of the chrominance code amount to the luminance code amount; and
   a rate control unit configured to change, based on a result of the comparison by the calculation unit, a coefficient value of at least one of a first quantization matrix for the luminance signal and a second quantization matrix for the chrominance signal which are to be used in the quantization by the coding unit.

2. The video signal coding apparatus according to claim 1, wherein the rate control unit is configured to increase the coefficient value of the first quantization matrix for the luminance signal, when it is judged from the result of the comparison by the calculation unit that the luminance code amount is prioritized in the comparison with the chrominance code amount.

3. The video signal coding apparatus according to claim 2, wherein the rate control unit is further configured to increase the coefficient value of the second quantization matrix for the chrominance signal, when it is judged from the result of the comparison by the calculation unit that the chrominance code amount is prioritized in the comparison with the luminance code amount.

4. The video signal coding apparatus according to claim 1, wherein the rate control unit is configured to decrease the coefficient value of the second quantization matrix for the chrominance signal, when it is judged from the result of the comparison by the calculation unit that the luminance code amount is prioritized in the comparison with the chrominance code amount.

5. A video signal coding method which codes a video signal including a luminance signal and a chrominance signal, and outputs a coded signal, the video signal coding method comprising:
   a coding step of coding of at least quantization on a picture included in the video signal, and an outputting of the coded signal;
   a code amount obtainment step of obtaining a luminance code amount and a chrominance code amount which are two code amounts included in the coded signal output from the coding step, the luminance code amount being a code amount related to the luminance signal, and the chrominance code amount being a code amount related to the chrominance signal;
   a calculation step of comparing the luminance code amount with the chrominance code amount obtained by the code amount obtainment step based on a ratio of the chrominance code amount to the luminance code amount; and
   a rate control step of changing, based on a result of the comparison by the calculation step, a coefficient value of at least one of a first quantization matrix for the luminance signal and a second quantization matrix for the chrominance signal which are to be used in the quantization by the coding step.

6. An integrated circuit which codes a video signal including a luminance signal and a chrominance signal, and outputs a coded signal, the integrating circuit comprising:
   a coding unit configured to perform coding of at least quantization on a picture included in the video signal, and an output of the coded signal;
   a code amount obtainment unit configured to obtain a luminance code amount and a chrominance code amount which are two code amounts included in the coded signal output from the coding unit, the luminance code amount being a code amount related to the luminance signal, and the chrominance code amount being a code amount related to the chrominance signal;
   a calculation unit configured to compare the luminance code amount with the chrominance code amount obtained by the code amount obtainment unit based on a ratio of the chrominance code amount to the luminance code amount; and
   a rate control unit configured to change, based on a result of the comparison by the calculation unit, a coefficient value of at least one of a first quantization matrix for the luminance signal and a second quantization matrix for the chrominance signal which are to be used in the quantization by the coding unit.

* * * * *